United States Patent Office 3,111,498
Patented Nov. 19, 1963

3,111,498
PROCESS FOR PREPARING LATICES OF
ISOBUTYLENE POLYMERS
Richard Louis Ray, Baton Rouge, and Willie Earl McAdams, Baker, La., assignors to Esso Research and Engineering Company, a corporation of Delaware
No Drawing. Filed Aug. 30, 1961, Ser. No. 134,810
3 Claims. (Cl. 260—29.7)

This invention relates to a method for preparing butyl rubber latex and more particularly relates to a method of reducing the number of processing steps in the preparation of butyl rubber latex and is a continuation-in-part of Serial No. 23,367, filed April 20, 1960, and now abandoned.

In the usual method for the preparation of butyl rubber latices the polymer is first dissolved in a hydrocarbon solvent to form a cement. This cement is then emulsified in water in the presence of a suitable emulsifier to form a raw latex. This raw latex is then stripped with wet nitrogen or other inert gas to remove the hydrocarbon solvent and some of the water. Further amounts of water are removed by concentrating, by creaming or centrifuging, or even stripping. Since stripping requires the use of heat to volatilize the solvent, there is always the danger of a certain amount of coagulation of the rubber. However, the greatest difficulty encountered in the stripping is that of foaming due to the presence of the emulsifier. It is, of course, known that foaming can be reduced if not prevented by the addition of certain antifoamants, but the use of these materials increase the cost of the latex and in many cases the ash content of the final latex causes imperfections in resulting cast films.

It is, therefore, the main object of this invention to provide the art with a method whereby the processing steps in the preparation of butyl rubber are simplified.

It is a further object of this invention to provide a method for the substantial elimination of foaming difficulties in the stripping of butyl latex.

It is a still further object of this invention to eliminate the solvent stripping step in the preparation of butyl rubber latex thus reducing the amount of antifoam agents needed.

These and other objects of this invention are accomplished by preparing a solution of butyl rubber in a hydrocarbon solvent, emulsifying this solution in water and then coagulating the rubber by adding methanol to this emulsion. The coagulum is squeezed dry to remove most of the solvent and then redispersed in water containing additional emulsifier. The remaining small amount of solvent still present is then removed together with the desired amount of water with only a minimum amount of stripping.

The polymers to which the invention is applicable are polyisobutylene and butyl rubber, a copolymer of isobutylene and a minor amount of a conjugated diolefin of 4 to 8 carbon atoms such as isoprene, butadiene-1,3 and dimethylbutadiene. Such polymers are prepared by low temperature polymerization in the presence of a solution of a Friedel-Crafts catalyst in a lower alkyl halide, such as methyl chloride, as described in U.S. Patent No. 2,356,128.

The solvents which may be used to dissolve the polymer include carbon disulfide and carbon tetrachloride and all types of hydrocarbon solvents, e.g., hexane, heptane, octane, isooctane, the nonanes, the decanes, naphtha fractions, benzene, toluene, Solvesso 100 (a highly aromatic hydrocarbon fraction, boiling 157–177° C.), Solvesso 150 (similar to Solvesso 100 but boiling 190° to 210° C.), Varsol (a mineral spirits fraction boiling 150° to 200° C.), cyclohexane, and cyclohexene.

Emulsifiers suitable for preparing the raw latex include any of the surface-active agents disclosed in Industrial and Engineering Chemistry, January 1939, pages 66–69; January 1941, pages 16–22; January 1943, pages 126–130; various fatty acids or mixtures of fatty acids such as the commercial mixtures obtained by the hydrolysis of naturally occurring fats and oils (e.g. tallow acids and tall oil acids). In general, any non-ionic or ionic emulsifier can be used depending on the end use of the latex. A particularly stable latex can be prepared by the use of an alkali metal, alkaline earth metal or ammonium salt of sulfated alkyl phenoxyethoxy ethanol (e.g. the sodium salt of sulfated nonyl phenoxy ethoxy ethanol) and a monovalent salt of dihydrogen ortho-phosphate, e.g., sodium dihydrogen phosphate.

In the practice of the invention a raw latex is prepared by emulsifying a 10% to 30% by weight solution of butyl rubber (cement) in a hydrocarbon solvent, such as hexane, with 25 to 100 parts by weight of water per 100 parts by weight of cement by blending in any type of equipment which gives violent agitation, such as a colloid mill, a dispersator, a Waring Blendor, and the like. A particularly suitable type of equipment has been found to be a sonic mixer known as the Rapisonic homogenizer. This consists of a gear pump which forces the materials through an orifice and impinges the stream on a vibrating knife edge encased in a resonating bell. The energy of vibration is obtained from the force of the stream striking and passing over the blade.

The raw latex is then coagulated with methanol by adding the methanol to the latex. The latex will not coagulate if the latex is added to the methanol or if other usual coagulating agents are used, such as acetone or isopropanol. The coagulum is squeezed dry until it contains less than 10% of non-volatile materials. At this point, a unique physical change has taken place in the rubber mass. It has not coagulated as a solid mass but rather as extremely small individual particles which are very easily separated by low shear. The substantially hexane-free coagulum can then be redispersed in 200 to 600 parts by weight of water per 100 parts of rubber, containing additional emulsifier, in an amount necessary to replace that lost through coagulation. The resulting latex has a hydrocarbon solvent content no greater than 10% and can be easily stripped off with the water with minimum foaming difficulties.

The advantages of the invention will be better understood from a consideration of the following experimental data which are given for the sake of illustration, but without intention of limiting the invention thereto.

*Example 1*

A butyl rubber latex was prepared from the following recipe:

| | Parts by weight |
|---|---|
| Solution of butyl rubber in hexane (23 wt. percent N.V.M.) | 60.6 |
| Water | 36.7 |
| Emulsifier: Sodium salt of sulfated nonylphenoxyethoxy ethanol (per 100 parts of rubber solids) | 2.5 |
| $NaH_2PO_4$ (per 100 parts rubber solids) | 0.1 |
| $H_2O$/rubber ratio=2.6. | |

The above ingredients were combined and placed in a dispersator for one hour. The resulting raw latex was then coagulated with one part by weight of methanol per 100 parts of latex by adding 5 cc. of methanol to the latex slowly. The coagulum was very mobile, non-sticky, and very easily broken apart. After squeezing dry to about 10% volatiles (water and hexane), it was put back in the dispersator with an amount of water equal to that originally used. This water contained 4 parts by weight (per 100 parts of rubber) of the same emulsifier to replace that lost with the hexane. The mixture was allowed to emulsify for one hour in the dispersator and then given three passes through the Rapisonic homogenizer. After completion of the emulsification, the resulting latex had the following inspections:

24.4 wt. percent rubber solids in emulsified form.
4.0 wt. percent hexane.
70.1 wt. percent water.
$H_2O$/rubber ratio=2.9/1.

This latex was easily stripped under vacuum with wet nitrogen to a concentration of 48.5% of rubber solids content with low to moderate foaming. The hexane was removed with the water and no antifoam agent was necessary during the first part of the stripping operation.

When an attempt was made to repeat this process by coagulating the butyl rubber from its solution in hexane prior to emulsifying in water, a sticky, gummy mass was obtained which could not be satisfactorily dispersed in water.

*Example II*

The experiment of Example I was repeated except that the amount of methanol was doubled. The resulting coagulum could still be redispersed in water but the particles were larger than those obtained in Example I.

*Example III*

The experiments of Examples I and II were repeated using 5 cc. and 10 cc., respectively of acetone instead of methanol. In each case a large "ball" or mass of particles were obtained with small flocculant particles floating in the serum. The mass of coagulum was tacky and gummy and could not be broken apart into small particles and therefore could not be redispersed in water.

*Example IV*

The experiment of Example II was repeated except that the latex was added to the methanol. Two large masses of coagulum formed. When these masses were torn apart, a stringy material was obtained. No discrete particles were obtained and the material could not be redispersed in water.

*Example V*

The experiment of Example I was repeated using 5 cc. of isopropanol instead of methanol. The coagulum was in the form of small sticky balls about ⅛ inch in diameter which could not be redispersed in water.

The above examples show that a water-redispersible coagulum of butyl rubber polymer can be obtained only by adding methanol to the latex. The addition of latex to the methanol or the addition of acetone or isopropanol to the latex fails to give a redispersible coagulum.

The nature of the present invention having been thus fully set forth and specific examples of the same given, what is claimed as new and useful and desired to be secured by Letters Patent is:

1. Process for preparing latices of a copolymer of isobutylene and a minor amount of isoprene which comprises dissolving said copolymer in hexane to form a solution containing 23 wt. percent of copolymer; emulsifying said solution with water in the proportion of 70 parts by weight of copolymer solution to 30 parts by weight of water to form a raw latex, said emulsification taking place in the presence of five parts by weight per 100 parts of copolymer of the sodium salt of sulfated nonylphenoxyethoxy ethanol; adding methanol slowly to the raw latex to coagulate the same; squeezing the coagulated copolymer until said copolymer contains less than 10% of non-volatile materials; redispersing the coagulated copolymer in the same quantity of water in which it was originally dispersed; and stripping the resulting dispersion to the desired concentration.

2. Process for preparing latices of isobutylene polymers which comprises dissolving said polymers in a solvent chosen from the group consisting of hexane, heptane, octane, isooctane, the nonanes, the decanes, benzene, toluene, aromatic hydrocarbon fractions boiling between 157–177° C., aromatic hydrocarbon fractions boiling 190 to 210° C., mineral spirits boiling 150 to 220° C., cyclohexane, cyclohexene, carbon disulfide, and carbon tetrachloride to form a solution containing 10% to 30% by weight of polymers; emulsifying said solution in 25 to 100 parts of water per 100 parts of polymer solution to form a raw latex; adding methanol slowly to the raw latex to coagulate the same; squeezing the coagulated polymers until said polymers contain less than 10% of non-volatile materials; redispersing the coagulated polymer in 300 to 600 parts by weight of water per 100 parts of polymer; and stripping the resulting dispersion to the desired concentration.

3. Process for preparing latices of isobutylene polymers which comprises dissolving said polymers in a solvent chosen from the group consisting of hexane, heptane, octane, isooctane, the nonanes, the decanes, benzene, toluene, aromatic hydrocarbon fractions boiling between 157–177° C., aromatic hydrocarbon fractions boiling 190 to 210° C., mineral spirits boiling 150 to 220° C., cyclohexane, cyclohexene, carbon disulfide, and carbon tetrachloride to form a solution containing 10% to 30% by weight of polymer; agitating said solution in 25 to 100 parts of water per 100 parts of polymer solution in the presence of an emulsiger to form a raw latex; said emulsification taking place in the presence of five parts by weight per 100 parts of polymers of the sodium salt of sulfated nonylphenoxyethoxy ethanol; adding methanol slowly to the raw latex to coagulate the same; squeezing the coagulated polymers until said polymers contain less than 10% of non-volatile materials; redispersing the coagulated polymers in 300 to 600 parts by weight of water per 100 parts of polymers; and stripping the resulting dispersion to the desired concentration.

References Cited in the file of this patent

UNITED STATES PATENTS

| | | |
|---|---|---|
| 2,371,722 | Wanderer | Mar. 20, 1945 |
| 2,912,401 | Aldridge et al. | Nov. 10, 1959 |
| 2,947,715 | Charlet et al. | Aug. 2, 1960 |